United States Patent [19]

Weichman

[11] Patent Number: 4,517,233
[45] Date of Patent: May 14, 1985

[54] TWO-WIRE CARRIER EDGE PROTECTOR TRIM STRIP

[75] Inventor: Edward C. Weichman, Rock Hill, S.C.

[73] Assignee: Schlegel Corporation, Rochester, N.Y.

[21] Appl. No.: 590,192

[22] Filed: Mar. 16, 1984

[51] Int. Cl.³ .................... E06B 7/22; E04F 19/02
[52] U.S. Cl. ................... 428/108; 428/111; 428/114; 428/122; 428/358; 49/490; 52/716
[58] Field of Search ............. 428/122, 358, 37, 114, 428/111, 108; 52/716; 49/490

[56] References Cited

U.S. PATENT DOCUMENTS

| | | | |
|---|---|---|---|
| 2,204,630 | 6/1940 | Spraragen | 296/44.5 |
| 4,071,647 | 1/1978 | McMullen | 428/108 X |
| 4,413,033 | 11/1983 | Weichman | 428/358 X |

Primary Examiner—Alexander S. Thomas
Attorney, Agent, or Firm—Cumpston & Shaw

[57] ABSTRACT

A channel-shaped two-wire carrier is coated with elastomeric material to form an edge protector trim strip of substantially U-shaped cross section. The two-wire carrier is formed from juxtaposed metallic serpentine wires. Each serpentine wire has oppositely facing looped edge portions or bights joined by lengths of wire extending transversely and spaced from one another longitudinally of the carrier. A plurality of strands of material extending longitudinally of the carrier is interwoven with the support and reinforcing wires to maintain the spaced relation.

5 Claims, 6 Drawing Figures

TWO-WIRE CARRIER EDGE PROTECTOR TRIM STRIP

BACKGROUND OF THE INVENTION

1. Field of the Invention

This invention relates generally to wire carrier edge protector trim strips. More particularly, this invention relates to a two-wire carrier formed from support and reinforcing continuous metallic serpentine wires selectively arranged with at least portions of the widths thereof in juxtaposed relation.

2. Description of the Prior Art

Lansing, U.S. Pat. No. 3,198,689 discloses a wire carrier edge protector trim strip in which the wire carrier comprises a continuous, serpentine wire having lengths thereof extending transversely of the carrier and longitudinally spaced from one another. The wire lengths are stayed and maintained in their spaced relation with one another by interweaving with them a plurality of strands of material randomly located transversely of the wire lengths from one edge to the other. In Lansing, the wire carrier is coated with an elastomeric material while in a flat condition. After the coating operation, the flat coated wire carrier is formed by form rolls into an edge protector trim strip of substantially U-shaped transverse cross section.

U.s. Pat. Nos. 4,304,816 and 4,310,164 disclose edge protector trim strips having stamped metal carriers. In U.S. Pat. No. 4,304,816, a flexible substantially inextensible member, such as a polyester tape, is secured to the carrier along one surface thereof to prevent stretching of the strip. In U.S. Pat. No. 4,310,164, an elongated practically inextensible non-metallic strand-like member, such as a thread, is embedded between the sealing and gripping parts of the strip to extend longitudinally thereof and prevent stretching of the strip.

U.S. Pat. Nos. 3,108,338 and 4,107,898 relate to edge protector trim strips having stamped metal, channel shaped, carriers provided with connecting links adjacent the free edges of the channels. The links prevent stretching of the strips along the edges thereof.

It is further known in flush glass automotive design to provide an upper header seal comprising an extended profile having embedded therein two wire carriers of different size.

In the process of manufacturing an edge protector trim strip, a U-shaped wire carrier is fed through an extruder where an elastomeric material is coated thereon.

When a finished edge protector trim strip is mounted on a flange, particularly one of sharp radius or curvature, unequal stresses are generated in the strip. For example, a U-shaped trim strip mounted on a sharp radius flange, in which the base of the trim strip is bent in a direction opposite from the direction in which the sides thereof extend, causes measurable base compression. The compression can reach undesirable proportions causing the trim strip to collapse, buckle or roll in the vicinity of the flange radius. Also, a trim strip mounted on a sharp radius flange, in which the base of the trim strip is bent in the same direction in which the sides thereof extend, causes side compression. Such compression can also reach a point causing the trim strip to deform, collapse or buckle. This problem of a trim strip deforming, buckling or collapsing when mounted on a flange of sharp radius is substantially overcome by the two-wire carrier of this invention.

SUMMARY OF THE INVENTION

In accordance with this invention, a twowire carrier is incorporated in an edge protector trim strip for effectively overcoming problems in the manufacture and use of edge protector trim strips. These problems have been solved in a simple, convenient and highly effective way by selectively arranging support and reinforcing serpentine wires of the two-wire carrier with at least portions of the widths thereof in juxtaposed relation.

More specifically, the two-wire carrier for use in edge protector trim strips comprises support and reinforcing continuous metallic serpentine wires, each having oppositely facing looped edge portions or bights joined by lengths of wire extending transversely and spaced from one another longitudinally of the carrier. The support and reinforcing wires are selectively arranged with at least portions of the widths thereof in juxtaposed relation depending upon which longitudinally extending portions of the finished edge protector trim strip it is desired to reinforce. A plurality of strands of material extend longitudinally of the carrier and are interwoven with the support and reinforcing wires to maintain the spaced relation of the wire lengths.

An advantage of the present invention is to provide, among other things, manufacture of edge protector trim strips of improved quality and increased resistance to compression, stretching and deformation of selected longitudinally extending portions thereof.

The invention and its advantages will become more apparent from the detailed description of the invention presented below.

BRIEF DESCRIPTION OF THE DRAWINGS

The details of the invention will be described in connection with the accompanying drawings, in which.

DETAILED DESCRIPTION OF THE INVENTION

Figure 1:
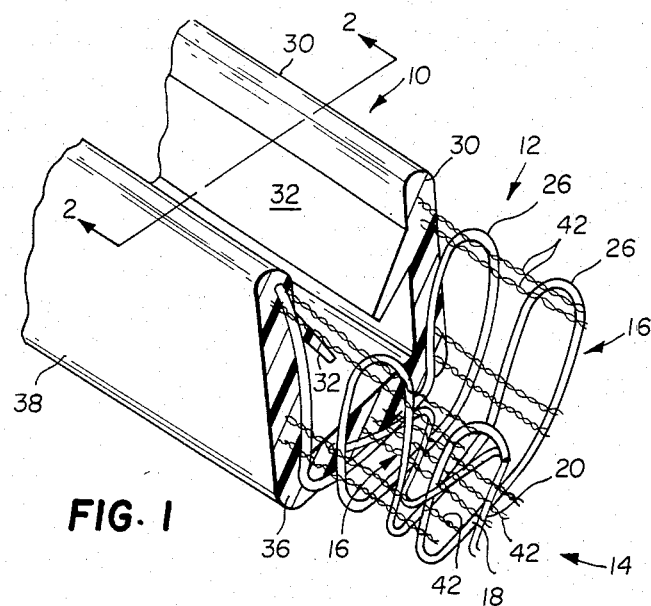
FIG. 1 is a perspective view of a portion of an edge protector trim strip embodying the principles of this invention, the trim strip further having the coating removed at one end thereof to show the two-wire carrier.
Figure 2:
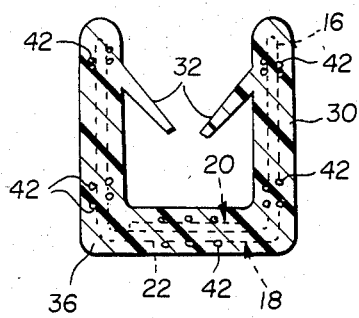
FIG. 2 is a section view taken substantially along line 2—2 of FIG. 1.
Figure 3:
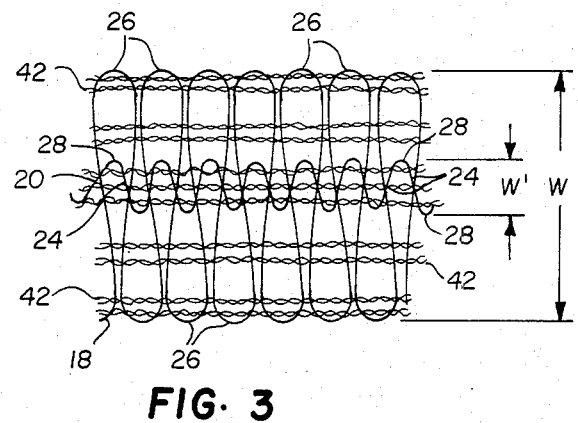
FIG. 3 is a top plan view of the two-wire carrier of FIG. 1 in a flat condition prior to being bent into a channel shape.

With reference to FIGS. 1–3, a preferred embodiment of an edge protector trim strip 10 of this invention is disclosed. The trim strip comprises a bendable supporting channel-shaped two-wire carrier 12 of substantially U-shape in transverse section, having a central or base portion 14 and opposite, upwardly extending edge portions 16.

The two-wire carrier 12 comprises continuous serpentine metal support and reinforcing wires 18, 20 respectively having first and second lengths 22, 24 respectively of wire extending transversely of the carrier and in spaced relation with one another longitudinally thereof, as shown. These lengths 22, 24 of wire are joined together by looped edge portions or bights 26, 28 respectively to form the continuous serpentine wires.

Wire 18 may be formed of a tempered carbon steel, for example, having a tensile strength between 56,250 and 69,750 kg.s.cm (125,000 and 155,000 p.s.i.) and a diameter of about 0.76 cm (0.03 inch). Wire 20 may be formed of any suitably rigid material to provide the desired degree of rigidness of the trim strip. It will be appreciated that wires 18 and 20 may be separately selected to provide desired combinations of lateral and longitudinal characteristics. Each wire is of sufficient rigidity to maintain the channel shape of the trim strip, subject to bending of the wire loops and lengths individually, to enable the trim strip as a whole to be readily bent to conform to and fit differently curved edges of structural flanges. The multiplicity of wire loops, acting in unison, maintain the channel shape of the trim strip and support a coating 30 and clamping fins 32 while the wire lengths yield sufficiently to provide the desired flexibility and compression resistance required of the trim strip.

Figure 4:
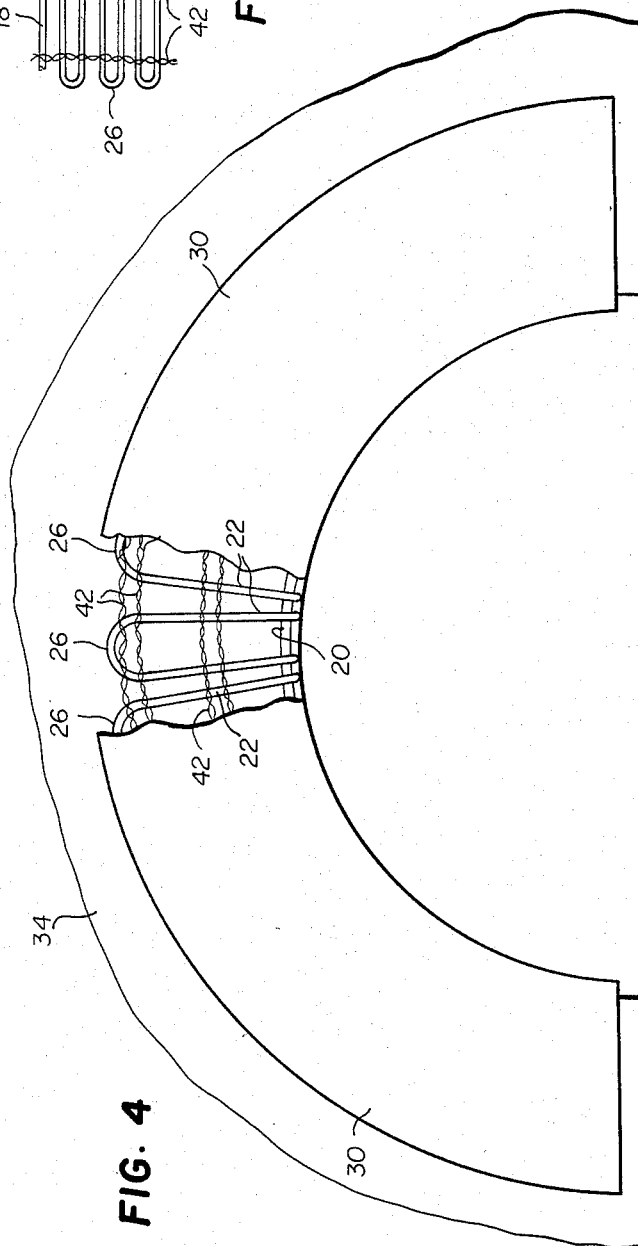
FIG. 4 is a side elevational view of the trim strip of FIG. 1 mounted on a flange defining a sharp radius, and with a portion of the coating omitted to show the compression resistant two-wire carrier.

The support and reinforcing wires 18, 20 respectively are arranged with at least portions of the widths W, W' thereof in juxtaposed relation, as best seen in FIG. 3. The widths of each serpentine wire is defined by the distance across or extending between parallel, spaced apart edge lines tangent to opposed bights. The serpentine wires are preferably of substantially the same pitch. By varying the width of reinforcing wire 20 and its position relative to support wire 18, it is possible to selectively reinforce different longitudinally extending portions of a finished trim strip 10. When reinforcing wire 20 is selected of a width W' substantially equal to the width of base 14 of carrier 12 and arranged along the longitudinally extending central portion of support wire 20, as seen in FIG. 3, then bent into a channel shape and coated with an elastomeric material, a finished trim strip 10 is obtained (FIG. 1) in which the base 36 thereof is reinforced. The reinforced base resists deformation, buckling and compression when the trim strip is mounted on a flange 34 defining a sharp radius, as best seen in FIG. 4.

Before the two-wire carrier 12 is bent into a channel shape and coated with an elastomeric material to form a finished trim strip 10 having resilient and compressible fins 32 extending longitudinally of the strip, the looped edge portions or bights 26, 28 and first and second lengths 22, 24 of the support and reinforcing wires 18, 20 respectively are stayed and maintained in their spaced relation with one another by interweaving with them a plurality of strands 42 of material. The material may be of any suitable type such as polyester, cotton, fiberglass or light wire, for example, capable of maintaining the spacing between the wire lengths 22, 24 of the wire carrier 12 without interfering materially with its flexibility. The interweaving of the strands 42 of material is facilitated by providing support and reinforcing serpentine wires 18, 20 respectively of substantially the same pitch juxtaposed in register with one another. The number of such strands 42 may be reduced in light of the use of reinforcing wire 20.

Figure 5:
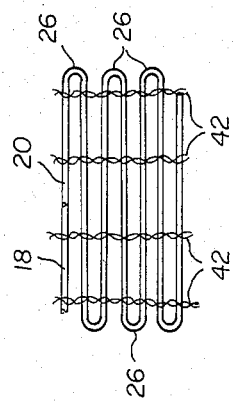
FIGS. 5–6 are top plan views of different embodiments of a flat two-wire carrier before being bent into a two-wire channel-shaped carrier.
Figure 6:
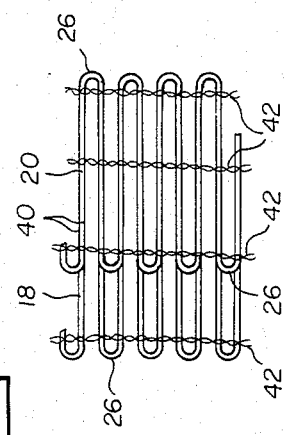

With reference to FIGS. 5-6, different embodiments of the two-wire carrier 12 are disclosed in substantially flat form, as manufactured and before forming into U-shape. In FIG. 5, the support and reinforcing wires 18, 20 respectively are of substantially the same width and pitch. After bending and coating, a finished trim strip results in which base and side portions thereof resist deformation, buckling, and compression when the trim strip is mounted on a support flange.

With reference to FIG. 6, reinforcing wire 20 is selected of a width W' (as per FIG. 3) substantially equal to the combined width of the base and an edge portions of the carrier. The reinforcing wire 20 is placed in juxtaposition with a central portion and one of the edge portions of support wire 18 for reinforcing base 36 and a side portion 38 of a finished trim strip 10, as shown in FIG. 1.

While presently preferred embodiments of the invention have been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

I claim:

1. A longitudinally extending two-wire carrier adapted to be formed into a U-shape including two relatively straight side portions and a base portion for use in an edge protector trim strip comprising:
   a continuous metallic serpentine support wire having oppositely facing first bights joined by first lengths of said wire extending transversely and spaced from one another longitudinally of said carrier, said oppositely facing first bights being spaced from one another a predetermined distance between parallel lines tangent to said first bights for defining the width of said support wire;
   a continuous metallic serpentine reinforcing wire having oppositely facing second bights joined by second lengths of wire extending transversely and spaced from one another longitudinally of said carrier, said oppositely facing second bights being spaced from one another a finite distance substantially less than said predetermined distance between parallel lines tangent to said second bights for defining the width of said reinforcing wire, the entire width of said reinforcing wire being selectively arranged in juxtaposed relation with no more than a portion of said support wire; and
   a plurality of strands of material extending longitudinally of said carrier and interwoven with said support and reinforcing wires to maintain the spaced relation of said first and second wire lengths thereof.

2. The invention according to claim 1 wherein said wire carrier is of a width substantially equal to said predetermined distance, and said finite width of said reinforcing wire is substantially less than said predetermined distance and the entire width of said reinforcing wire is juxtaposed with a combined edge portion and central portion of said support wire.

3. The invention according to claim 2 wherein said wire carrier is substantially U-shaped in transverse cross section to form a base and opposed side portions, and a coating of flexible, resilient elastomeric material is secured to said wire carrier to form an edge protector trim strip, said coating being formed at the inner sides of said side flanges with resilient and compressible fins extending longitudinally of said carrier.

4. The invention according to claim 1 wherein said wire carrier is substantially U-shaped in transverse cross section to form a base and opposed side portions, and a coating of flexible, resilient elastomeric material is secured to said wire carrier to form an edge portector trim strip, said coating being formed at the inner sides of said side flanges with resilient and compressible fins extending longitudinally of said carrier.

5. The invention according to claim 4 wherein said wire carrier is substantially U-shaped in transverse cross section to form a base and opposed side portions, and a coating of flexible, resilient elastomeric material is secured to said wire carrier to form an edge protector trim strip, said coating being formed at the inner sides of said side flanges with resilient and compressible fins extending longitudinally of said carrier.

* * * * *